United States Patent [19]
Queirel

[11] Patent Number: 4,883,419
[45] Date of Patent: Nov. 28, 1989

[54] DEVICE FOR THERMOFORMING PARTS FROM SYNTHETIC MATERIAL

[76] Inventor: Joël Queirel, La vendue Mignot, Saint Julien, Les Villas (Aube), France, 10800

[21] Appl. No.: 263,984

[22] Filed: Oct. 27, 1988

Related U.S. Application Data

[63] Continuation of Ser. No. 139,175, Dec. 28, 1987, abandoned, which is a continuation of Ser. No. 906,083, Sep. 11, 1986, abandoned.

[30] Foreign Application Priority Data

Sep. 11, 1985 [FR] France ................... 85 13483

[51] Int. Cl.$^4$ .............................................. B29C 1/14
[52] U.S. Cl. ............................... 425/326.1; 264/551; 425/327; 425/388; 425/397; 425/398
[58] Field of Search ............................ 264/322, 551; 425/324.1, 325, 327, 326.1, 387, 388, 394, 395, 397–400, 403.1

[56] References Cited

U.S. PATENT DOCUMENTS

| | | | |
|---|---|---|---|
| 3,562,859 | 2/1971 | McIntyre | 435/388 X |
| 4,105,736 | 8/1978 | Padovani | 264/551 X |
| 4,250,129 | 2/1981 | Winstead | 264/551 X |
| 4,308,005 | 12/1981 | Zundel | 425/388 X |
| 4,440,702 | 4/1984 | Susnjara | 425/397 X |

*Primary Examiner*—Charles Hart
*Attorney, Agent, or Firm*—Fleit, Jacobson, Cohn, Price, Holman & Stern

[57] ABSTRACT

An apparatus for manufacturing thermoformable parts includes an extruder for extruding a hot synthetic material to form a horizontal strip, a rolling device for rolling the strip, a chain device for drawing the strip along horizontally by its edges and with a continuous movement immediately upstream of a thermoforming station, a heating device for heating the strip upstream of the thermoforming station to a temperature compatible with thermoforming it over a part of its length substantially equal to that needed for the thermoforming operation, a cooling section between the heated part and the area in which the strip is rolled, and a thermoforming station for bringing the heated part into face-to-face relationship with a mold and for moving the mold in the same direction as the strip and at the same speed, so that the strip is simultaneously thermoformed and cut to yield a piece comprising the thermoformed part and a skin retaining the edge portions during continuous movement thereof. The molded and cut piece is removed while the skin is still held by the edge portions and the skin is then removed. The mold is returned to its initial position immediately at the end of the thermoforming operation. The skin that remains after the thermoforming operation is cut up and ground and the resulting granular material is recycled to the extruder which produces the strip. This granular material may be mixed with non-recycled granular material before it is recycled to the extruder.

17 Claims, 4 Drawing Sheets

DEVICE FOR THERMOFORMING PARTS FROM SYNTHETIC MATERIAL

This application is a continuation application Ser. No. 139,175 filed Dec. 28, 1987 (now abandoned), which is a continuation of application Ser. No. 906,083 filed Sept. 11, 1986 (now abandoned).

BACKGROUND OF THE INVENTION

1. Field of the invention

The present invention concerns the thermoforming of parts from a synthetic material and more particularly an apparatus therefor.

2. Description of the prior art

There is already known a method of manufacturing small parts from synthetic material which consists in extruding a thin strip, storing it in spools and then mounting these spools one by one on the input to a fixed mold thermoforming machine.

In order to reconcile the continuous feeding of the strip with the stopping of the film material in line with the mold during the thermoforming operation, the film is formed into a loop which imparts some slack. During the thermoforming operation the strip is stopped on the downstream side of the loop whereas the material continues to arrive on the upstream side, the consequence of which is to increase the length of the loop. When the thermoforming operation is completed the strip resumes its progress on the downstream side of the loop and shortens it, and this process is repeated iteratively.

Given the mandatory presence of a loop this method is applicable only if the extruded film is very thin as must be the case, for example, to manufacture yogurt pots, drinking vessels, etc.

In practice there are other occasions for manufacturing objects by thermoforming although these must have a much greater thickness: boxes, automobile dashboards, sanitary devices, etc.

In this case it is not possible to carry out thermoforming continuously and it is necessary to use an intermediate stage which consists in manufacturing plates from granular synthetic material, these plates being then brought individually to a thermoforming mold.

A sequence of heating and cooling operations then results because the granular materials are first melted to obtain plates, these are then cooled for storage and transportation, and then the plates must be heated to the proper thermoforming temperature; finally, after thermoforming the object is again cooled. The consecutive thermal shocks resulting from these operations and the necessity for storing and transporting the plates are all costly and affect the quality of the products obtained.

Attempts have already been made to carry out thermoforming immediately after extruding a strip, without forming any intermediary products such as spools or plates.

For example:

French Patent No. A-1436-900 describes a vertical thermoforming machine provided with means for guiding an extruded film. This film is fed by rollers in the upper and lower parts of the machine but over all of the length of the film and not by its edges. Thermoforming is applied when the film is still hot, no means being provided for monitoring the temperature of the film, or for creating a cold area, or for subsequent heating of the material or, of course, for securing it laterally during heating.

French Patent No. A-1549-532 concerns a machine for thermoforming extruded film fed by rollers on the upstream and downstream sides of a thermoforming station but over all the length of the machine and not by its edges. The material delivered at constant temperature is deformed into an S shape at the output from the extruder (and is not left horizontal) by rollers which are designed to cool it to the thermoforming temperature. In this case there is no provision for rolling or creating a cold area or heating.

U.S. Pat. No. 3,562,859 describes a thermoforming machine operating in consecutive intermittent cycles and not continuously. A film is placed below a fixed heating station. When the film reaches the required temperature a mold is actuated against the lower side of the film towards the heating members, this mold remaining fixed throughout the molding operation and immediately thereafter is moved horizontally to a stationary cooling station. When this operation is completed the mold is drawn back to its retracted position and stripped from the formed film which remains below the fixed cooling station. The mold is then brought under the heating station for the next cycle, and so on.

This machine makes no provision for combined extrusion and rolling or, for a cold area between the extruder and a heating station, or for a heating station that moves with the mold, or for molding and heating during linear displacement with the film itself moving uniformly and continuously.

The reader should note that in order to be effective the heating station must be operative very close indeed to the film and that as a consequence of this molding in the upward direction can only be done over a very short distance, to create small objects of limited relief.

The present invention is intended to alleviate these disadvantages and to provide a continous thermoforming without any creation of intermediate products (plates or spools) since there is a direct transition from the granular material to a thermoformable strip.

SUMMARY OF THE INVENTION

In one aspect, the invention consists in an apparatus for manufacturing thermoformed parts in which a hot synthetic material is extruded to form a horizontal strip which is rolled, drawn along horizontally by its edges and with a continuous movement immediately upstream of a thermoforming station, and heated upstream of the thermoforming station to a temperature compatible with thermoforming it over a part of its length substantially equal to that needed for the thermoforming operation so that there remains a cooler section between the heated part and the area in which the strip is rolled, the heated part is brought into face-to-face relationship with a mold, the mold is moved in the same direction as the strip and at the same speed, the strip is simultaneously thermoformed and cut to yield a piece comprising the thermoformed part and a skin retaining the edge portions, the molded and cut piece is removed still held by the edge portions and the skin is then removed, the mold being returned to its initial position immediately at the end of the thermoforming operation, the apparatus comprising an extrusion press, an extrusion head, a rolling machine, horizontal longitudinal members, horizontal feed means upstream of a thermoforming station adapted to hold the longitudinal edges of a strip of thermoformable material leaving the extrusion head and the rolling machine, means on the horizontal longitudinal members for imparting continuous movement to the horizontal feed means, a mobile assembly comprising a thermoforming mold and a backing member therefor respectively disposed above and below the location of the thermoformable strip and means for heating the thermoformable strip situated on the side of the mobile assembly nearer the rolling machine, means on the horizontal longitudinal members for guiding and imparting reciprocating horizontal movement to the mobile assembly, and means for cutting the strip into a thermoformed part and a skin that is to remain held by the feed means and for removing first the thermoformed part and then the skin separated from the feed means.

In accordance with other characteristics of this device:

the heating means comprise a frame and heating elements adjustable in position on the frame to suit the characteristics of the strip or of the thermoformed part;

the heating means comprise a frame and heating elements having individual heating powers adjustable independently;

the mobile assembly comprises a lower box section movable vertically, a lifting platform associated with and movable vertically relative to the lower box section and a removable mold adapted to be coupled to the lifting platform;

the box section has a lateral opening in it adapted to provide access to the mold when it is uncovered;

the means for imparting continuous movement to the strip feed means comprise at least a first endless loop chain, a motor driving the first chain, and coupling means for dynamically coupling the first chain and the mobile assembly when the latter is to be moved on a forward stroke and adapted to be neutralized when the mobile assembly is to be moved on a backward stroke;

the coupling means comprise a second closed loop chain, a first gearwheel interlocked to the second chain, a second gearwheel interlocked to the first chain and meshing with the first gearwheel, a plate fastened to the mobile assembly, gearwheels on the plate interlocked to the second chain, a motor kinematically coupled to one of the gearwheels on the plate and selectively operable so that when it is stopped the second chain drives the plate and the mobile assembly in the same direction at the same speed as the first chain and so that when it is running the one gearwheel to which the motor is kinematically coupled drives the plate and the mobile assembly in the opposite direction to the second chain.

According to another characteristic of this invention, the skin that remains after the thermoforming operation is cut up and ground and the resulting granular material is recycled to an extruder from which the strip is obtained. This granular material is preferably mixed with a non-recycled granular material, in the known manner.

The invention will be better understood from the following detailed description given with reference to the accompanying drawings, the description and the drawings being given by way of non-limiting example only.

DESCRIPTION OF THE PREFERRED EMBODIMENT

Referring to the drawing, it is seen that an installation in accordance with the invention comprises an extrusion press 1 the hopper 2 of which receives through a distribution trough 3 granular material from a distribution tank 4.

The extrusion press 1 is of any known type and it is therefore not necessary to describe it in detail. It is associated with an extrusion head 5 the orifice in which has a width and height corresponding to the width and height of the strip 6 to be extruded.

Immediately downstream of the extrusion head 5 is a rolling machine 7, also of any known type, adapted to confer on the strip 6 a precise thickness and good mechanical strength.

In this connection, it must be emphasized that only two heating rollers 8 and 9 have been shown in the drawing whereas in practice it is better to use a rolling machine comprising three rollers.

The known type rolling machines with three rollers are designed to form a strip from which plates are cut out prior to storage and dispatch so that on the downstream side of the rolling machine the extruded strip is at a relatively low temperature. A more detailed explanation will be given later as to why the apparatus in accordance with the invention makes provision for substantially different temperatures due to the fact that it is not necessary to provide as much cooling.

On leaving the rolling machine the extruded strip must be at a temperature which is significantly higher than in known installations, with the result that it can later be reheated to the thermoforming temperature more easily, without losing any of its mechanical strength by virtue of the presence of a "cold" area between the outlet from the rolling machine and the heating station.

Beyond the rolling machine 7 are parallel longitudinal members 10 and 11 resting on supports 12 situated to either side of a trench 13 spanned by the longitudinal members 10 and 11.

In the vicinity of their facing ends the longitudinal members 10 and 11 comprise gearwheels 15, 16, 17 and 18.

The gearwheels 16 and 18 are coupled by an axle 19 and the gearwheel 16 is coupled to a drive motor 20.

On the gearwheels 15 and 16, on the one hand, and on the gearwheels 17 and 18, on the otherhand, are two respective sprocket chains 21 and 22, the sprockets (not visible in the diagram) being designed to penetrate the material of the strip 6 near its longitudinal edges, as soon as it reaches the longitudinal members 10 and 11, that is to say immediately downstream of the rolling machine 7 and upstream of the area where the strip 6 is to be thermoformed. The sprockets serve to draw the strip 6 horizontally along the longitudinal members 10 and 11 from the point where it leaves the rolling machine 7 and also to retain it transversely since when it is reheated it tends to sag and thus to exert a lateral force.

Outside the longitudinal member 11 are two gearwheels 23 and 24 aligned with the gearwheels 17 and 18 and coupled to them so as to be driven in the same direction and at the same speed.

A go/no-go clutch may be provided for safety reasons between the gearwheel 24 and the gearwheel 18 so that the gearwheel 24 can be quickly decoupled and immobilized with the gearwheel 18 continuing to be driven by the axle 19 and the motor 20.

Fitted to the gearwheels 23 and 24 is a chain 25 which meshes with a gearwheel 26 through two direction-changing gearwheels 27 and 28, these last three gearwheels being mounted on a plate 29 fastened to a mobile assembly 30 which also carries a support 31 for a motor 32 driving a control gearwheel 33 to which the gearwheel 26 is coupled by means of a chain or belt 34.

With this arrangement it is readily understood that the chain 25 is driven in the same direction and at the same speed as the sprocket chains 21 and 22 and that, assuming the motor 32 to be stopped, the chain 25 entrains with it the plate 29 since the gearwheels 26, 27, 28 and 23 cannot rotate.

As the plate 29 is fastened to the mobile assembly 30, this is entrained in the same direction and at the same speed as the sprocket chains 21 and 22.

On the other hand, if the motor 32 is started up operated so as to drive gear 33 in the direction opposite to that in which the upper run of the chain 25 is driven, the assembly 30 may be immobilized or driven in one direction or the other depending on the speed of the motor 32 and of the chain 25.

In this instance, as it is a question of returning the assembly 30 to its initial position when it has been driven over a required predetermined distance at the same speed and in the same direction as the upper runs of the chains 21 and 22, the speed of the motor 32 is set to be greater than that of the chain 25 so that the assembly comprising the plate 29, the mobile assembly 30 and the support 31 is moved in the direction opposite to that in which the strip 6 is drawn by the sprocket chains 21 and 22.

The horizontal reciprocating movement of the mobile assembly 30 may be guided either by sets of rollers 40 cooperating with horizontal guides 41 or by rollers 42 which roll on the longitudinal members 10 and 11 themselves.

The mobile assembly 30 comprises lateral uprights 45 and 46 which lie outside the longitudinal members 10 and 11 so that the extruded strip 6 can pass through the mobile assembly 30.

This comprises a framework for supporting a two part assembly situated one above and one below the plane in which the strip 6 is to be located.

The upper part comprises edge grippers 47 of a type that is known per se mounted so as to be movable relative to the mobile assembly 30 by means of jacks 48.

The lower part of the mobile assembly 30 comprises a box section 50 inside which is a lifting platform 51 carrying a base 52 for a mold 53 of the shape necessary to thermoform the strip 6.

The box section 50 may be raised and lowered by jacks 55 independently of the lifting platform 51, which is itself movable vertically by means of sissors-type links 56 coupled to one or more jacks 57.

Given these provisions, the box section 50 may be raised towards the horizontal plane in which the strip 6 lies according to the shapes of the mold which may be, as is known per se, positive and/or negative, meaning featuring convexities above the plane of the strip 6 only or concavities below this plane only or convexities and concavities on either side of this plane at the same time.

It is also necessary to provide for the case in which the strip 6 could sag due to its own weight and due to the distance which separates the two sprocket chains 21 and 22. To avoid excessive tensions it is beneficial to make provision for lateral displacement of the chains 21 and 22.

Thus the strip 6 can move freely in all cases.

On the side of the mobile assembly 30 nearer the rolling machine 7 is a heating system which comprises a frame 60 held by ties 61 and serving as a support for heating elements 62 attached removably to the frame 60 so that their position can be adjusted.

The heating elements 62 process a section of the strip 6 situated upstream of the thermoforming station and corresponding to the length needed for the thermoforming operation. Also, depending on the shapes of the mold 53 and/or the characteristics of the strip 6, the heating elements 62 may be differently disposed so that they heat certain areas to a greater or lesser extent with a view to facilitating deformation of the strip 6 during thermoforming.

For the same reason, the heating elements 62 are individually adjustable to radiate more or less heat. Thus, for example, it is possible to heat the strip 6 more intensely in the area near the assembly 30 than in the more distant part, which is hotter than the former because it is nearer the rolling machine 7 and thus has had less time to cool.

On the other side of the trench 13 relative to the rolling machine 7 is a machine 65 for cutting up the strip 6 which remains after thermoforming and removal of the molded parts.

The machine 65 may be of the shears or shredder type and produces relatively coarse fragments which are evacuated by an inclined plane 66 and fall onto an elevator conveyor 67 terminating above a chute 68 of a grinder 69.

The grinder 69 discharges into one or more storage tanks, that have not been shown here in order to simplify the description, there being shown only a pipe 70 leading to a buffer storage tank 71 equipped with a chute 72 discharging above the loading hopper 2 of the extrusion press 1.

The device which has just been described operates as follows: at the output from the rolling machine 7 the extruded strip 6 is maintained at a higher temperature than is currently standard practice and which has to be an optimum compromise between the requirements in respect of mechanical strength, which impose a relatively low temperature, and the need to economize the energy costs of the heating elements 62 needed to raise the temperature of the strip 6 again at the time it is thermoformed.

Figure 1:
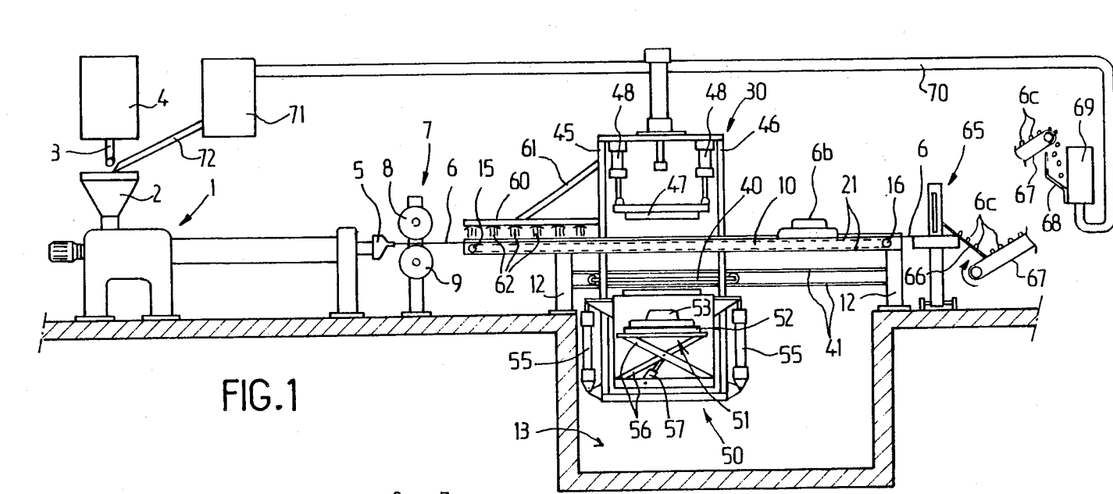
FIG. 1 is a schematic longitudinal side elevational view of an apparatus in accordance with the invention, shown partly in cross-section.

In the position shown in FIG. 1, the mobile assembly 30 is in the extreme upstream position, meaning as close as possible to the rolling machine 7, and the strip 6 which has been heated by the elements 62 is drawn along by the sprockets of the chains 21 and 22 so that its hottest part is situated vertically above the mold 53. This is in the lowered position, meaning that the lifting platform 51 and the box section 50 are both lowered.

Above the strip 6 the edge grippers 47 are in the raised position, the jacks 48 being in their retracted position.

When the thermoforming operation is carried out the motor 32 is stopped so that the mobile assembly 30 is driven at exactly the same speed as the strip 6 since the origin of its movement is the motor 20 which drives on the one hand the sprocket chains 21 and 22 and on the other hand the chain 25 with which the mobile assembly 30 is constrained to move by the motor 32 as already explained.

Figure 3:
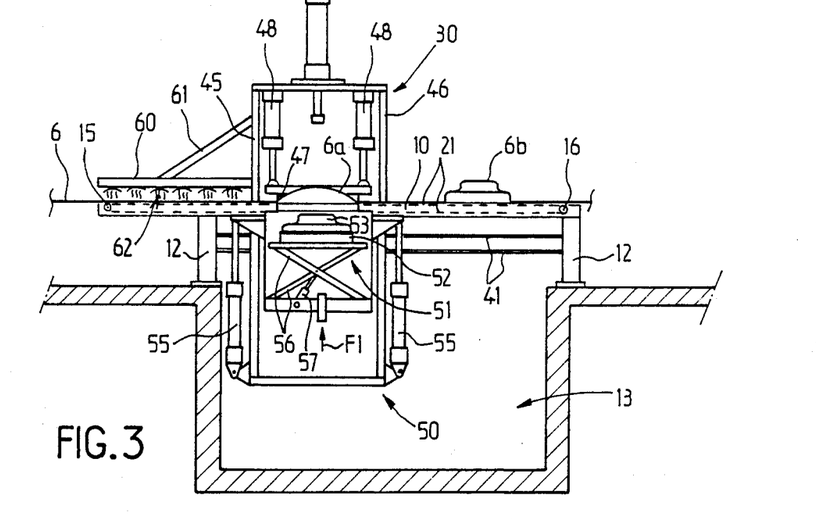
FIGS. 3 and 4 are two partial schematic views similar to FIG. 1, showing two extreme positions of a mobile assembly carrying a mold functioning in accordance with the invention and a heating station.

As soon as the mobile assembly 30 begins to move a control system of any known type causes the edge grippers 47 to be lowered and the box section 50 to be raised until the strip 6 is gripped and imprisoned all around the thermoforming area, as shown in FIG. 3.

In the manner that is known per se air is fed into the box section 50 as shown by the arrow F1 to increase the pressure under the strip 6, which deforms it into the shape of a dome 6a, this operation being known in the art as "bubbling".

This preliminary deformation of the strip 6 makes it better suited to more accurate and more marked deformation and avoids stresses due in particular to any more or less sharp edges that the mold 53 may feature.

Figure 4:
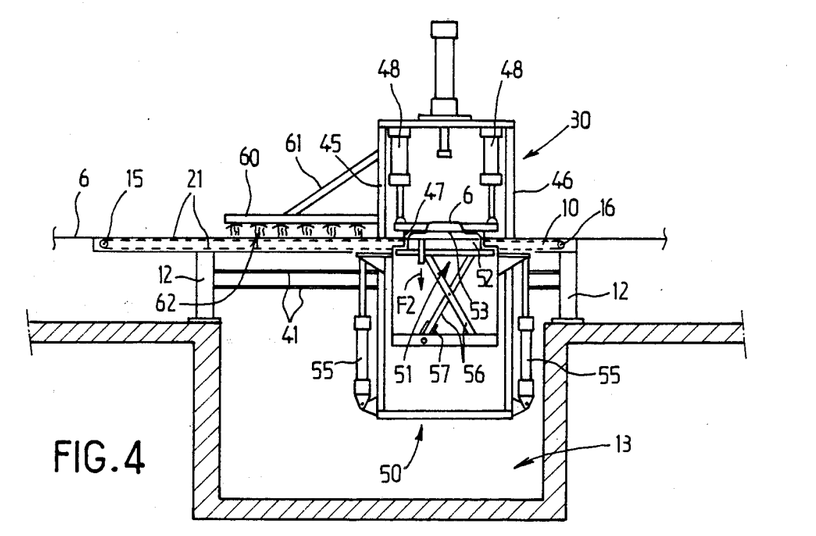
Figure 5:
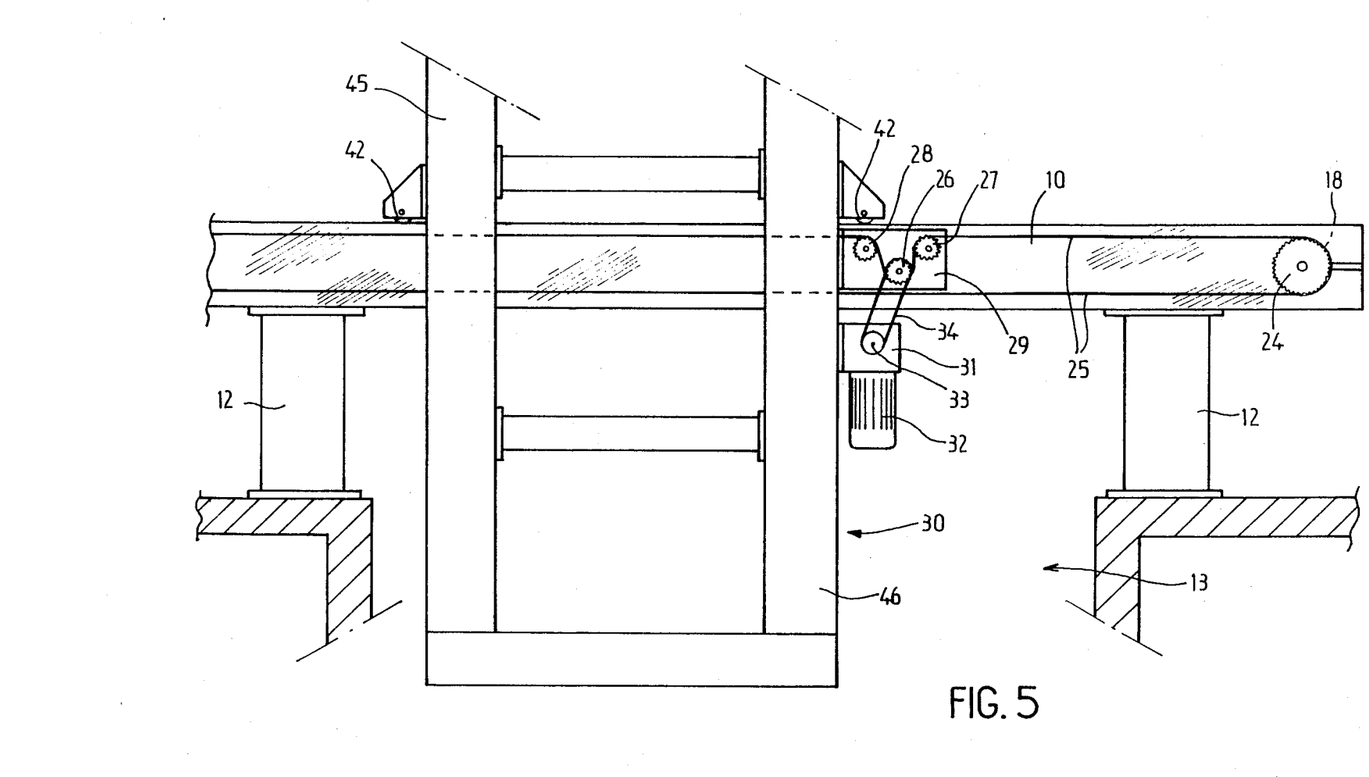
FIG. 5 is a partial schematic side elevational view on an enlarged scale, showing one embodiment of the invention with provision for reciprocating movement of the mobile assembly coordinated with movement of the strip to be thermoformed.
Figure 6:
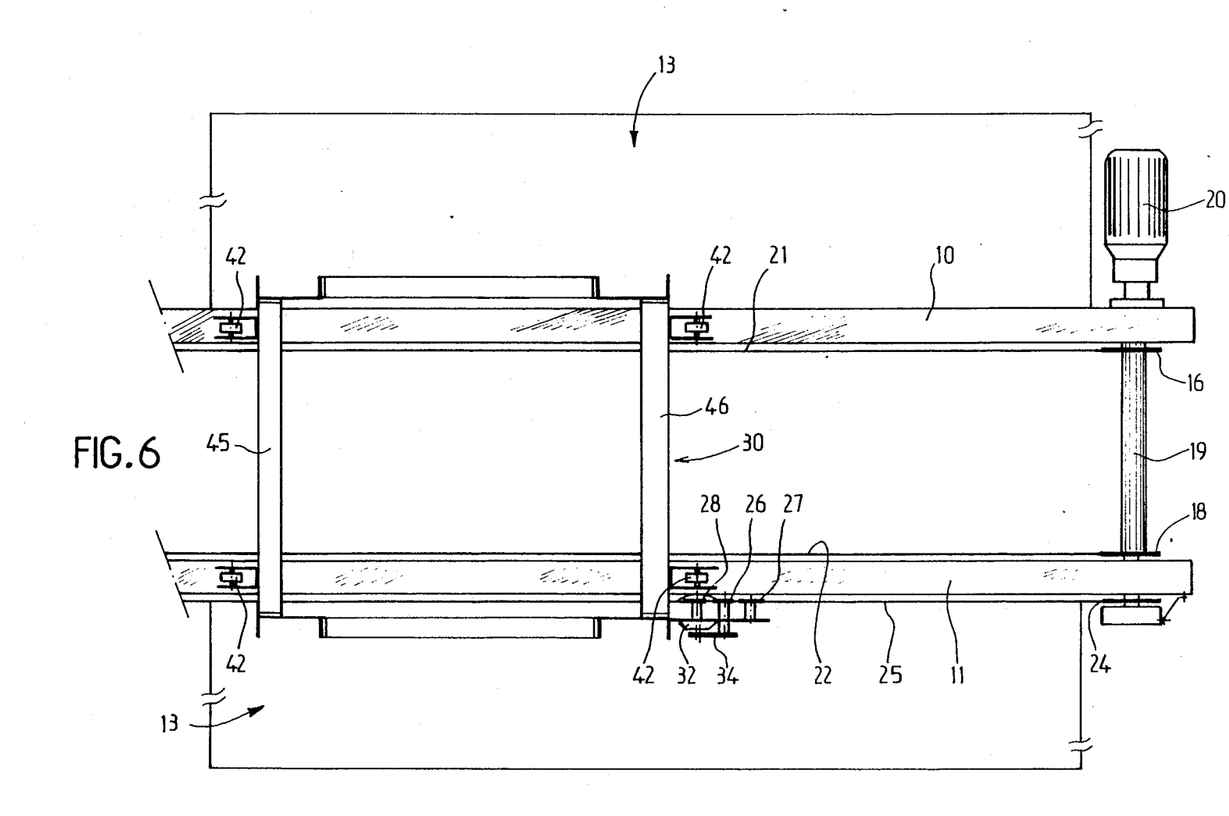
FIG. 6 is a partial schematic top plan view of FIG. 5, showing this same embodiment.

The control system then causes the lifting platform 51 to be raised automatically, so raising the mold 53, as shown in FIG. 4.

The thermoforming operation proper is then carried out and suction is applied as shown by the arrow F2 so that the strip 6 is pressed closely against the shape of the mold 53. Naturally enough, and as is well known per se, instead of depressurization in order to "suck" the material to be formed, pressure may be applied in order to "blow" it.

The forming of the material constituting the strip 6 is a known operation which will not be described in more detail here.

Note that the during the thermoforming operation the strip 6 and the mobile assembly 30 move in perfect synchronism and, at the end of the cycle, the assembly 30 is near the downstream end of the trench 13.

At the same time as thermoforming of the strip 6 was instigated the strip was cut around the part to be thermoformed so that there remains in the strip 6 a skin which is still gripped by the sprockets of the chains 21 and 22 and which therefore continues to move from the upstream end to the downstream end, in other words towards the cutting machine 65.

Figure 2:
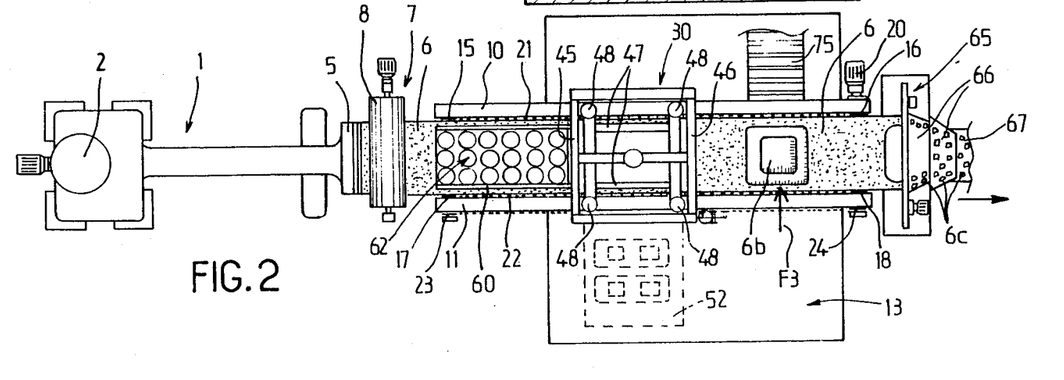
FIG. 2 is a schematic top plan view of the invention as shown in FIG. 1.

After thermoforming has taken place the edge grippers 47 are raised while the mold 53 and the box section 50 are lowered and the control system, at the end of the 'cycle, starts up the motor 32, the transmission system 34 of which drives the gearwheel 26 which, as it were, rolls on the chain 25, in the opposite direction of movement thereof, the chain 25 continuing to move from the upstream to the downstream end as the mobile assembly 30 returns to its upstream initial position, at the beginning of the cycle, as shown in FIGS. 1 and 2.

As the mobile assembly 30 returns to its initial position, the molded part 6b continues to move with the skin of the strip 6 and this part 6b is removed by any known means.

In FIGS. 1 and 2 this operation is schematically respresented by an arrow F3 indicating a thrust transverse to the direction of movement of the strip 6 towards a take-off conveyor 75.

The skin continues its movement towards the machine 65 which cuts it transversely and longitudinally into fragments 6c of relatively constant size which drop onto the conveyor 67, these fragments falling into the hopper 68 of the grinder 69 in which they are reduced to granules of the size required for them to be melted correctly after they are transported through the pipe 70 to the storage tank 71.

These recycled granules are mixed with granules of non-recycled material from the storage tank 4 in whatever proportions are required for the hopper 2 of the extruding press 1 to receive the correct mixture for proper formation of the strip 6 extruded by the head 5.

As already mentioned, it is beneficial for the temperature of the strip 6 on leaving the rolling machine 7 to be such that the strip 6 is both fairly strong in order to withstand the continuous traction of the sprocket chains 21 and 22 and sufficiently deformable for the parts to be thermoformed appropriately.

By choosing a temperature of approximately 100° C. for the exit roller of the rolling machine 7 the heating elements 62 can raise the temperature of the strip 6 to approximately 150°-190° C. during the relatively short time corresponding to the forward stroke of the mobile assembly 30, that is to say during the thermoforming operation. The area of the strip 6 between the rolling machine and the heating station is the least hot: 100° C. approximately; because of this the strip 6 features good mechanical strength, guaranteeing its resistance to the traction exerted here by the sprockets of the chains during the forward stroke, the heating elements 62 heating the part of the strip 6 which immediately afterwards is to be thermoformed on the downstream side of these.

As shown in FIG. 2, the box section 50 is advantageously open at one side to provide access to the interior and in particular to the mold support 52.

It is then very easy to replace the mold 53 with another mold 53a of a different shape, in just a few minutes and without shutting down the installation, at worst entailing slowing down the advance of the strip 6.

It is of little consequence that this produces waste material from the strip 6, meaning lengths that are not used to thermoform parts, since the material is recycled and therefore not entirely lost.

It is seen from the above description that the apparatus in accordance with the invention makes it possible to thermoform parts immediately after a strip is formed from granular material without any thermal shock, without any need to manufacture intermediate products, without storage and without transportation, which leads to reduced unit cost and improved quality.

The invention is particularly applicable to the thermoforming of parts from a thick strip (from a few millimeters up to a centimeter and more) in considerable widths (2 meters and more). The significant mass of material that a strip with the above dimensions represents is kept perfectly under control by the operation in accordance with the invention, whereas the prior art devices were applicable only to thin films and to manufacturing thin and small objects.

The part of the mobile assembly 30 opposite that carrying the heating system and which comprises the uprights 46, the edge grippers 47, etc may be made adjustable, together with the box section 50, so that their length may be adjusted to suit the dimensions of the parts to be thermoformed.

There is claimed:

1. An apparatus for manufacturing thermoformed parts comprising:
   extrusion press means for continuously extruding thermoformable material;
   an extrusion head on said press means through which said thermoformable material is extruded for producing a continuous flat strip of said material;
   rolling means downstream of said extrusion head for receiving and rolling said flat strip of material;
   substantially horizontal longitudinal members disposed downstream of said rolling means and extending substantially in a feed direction of said strip of material;
   substantially horizontal feeding means mounted on said longitudinal members adapted to engage the longitudinal edges of said strip of material downstream of said rolling means for feeding said strip of material in said feed direction;
   first drive means mounted on said longitudinal members and engaging said feeding means for imparting continuous movement to said feeding means and said strip of material;
   a mobile thermoforming assembly downstream of said rolling means and through which said longitudinal members and said feeding means extend comprising,
      thermoforming mold means movably mounted on one side of the plane of movement of said strip material when fed by said feeding means for movement into thermoforming engagement with said strip of material, backing means for said thermoforming mold means on the other side of said plane of movement of said strip of material,
      heating means between said mold means and said rolling machine means for heating said strip of material prior to thermoforming by said mold means, said heating means having an entrance end spaced from said rolling means a predetermined distance to facilitate cooling of said strip of material to a predetermined hardness prior to entering said heating means, and
      second drive means engaging said first drive means for moving said mobile assembly in said feed direction simultaneously with said feeding means and intermittently relatively to said feeding means in the direction opposite to said feed direction; and
   mobile assembly supporting means for supporting and guiding said mobile assembly for said movement in and opposite to said feed direction.

2. Apparatus as claimed in claim 1 wherein:
   said mobile thermoforming assembly further comprises a framework, said mold means, heating means and second drive means being supported on said framework; and
   said mobile assembly support means comprises means for supporting said framework for said movement of said mobile assembly.

3. Apparatus as claimed in claim 2, wherein:
   said feeding means comprises an endless chain means; and
   said second drive means comprises gear means rotatably mounted on said framework and engaging said endless chain means, and second drive motor means mounted on said framework and coupled to said gear means for preventing rotation of said gear means to lock said gear means to said endless chain means and for rotating said gear means to move said mobile assembly relative to said endless chain means.

4. Apparatus as claimed in claim 1 and further comprising:
   cutting means for cutting the strip of material to facilitate separating the thermoformed part from the remaining strip of material when said strip of material is still engaged by said feeding means; and
   further cutting means downstream of said feeding means for cutting said remaining strip of material into pieces.

5. Apparatus as claimed in claim 1 wherein:
   said heating means comprises a heater frame and a plurality of heating elements adjustably mounted on said heater frame for adjusting the heat received by the strip of material from each heating element.

6. Apparatus as claimed in claim 1 wherein:
   said heating means comprises a heater frame and a plurality of heating elements mounted on said heater frame, each heating element being adjustable independently to control the heating power thereof.

7. Apparatus as claimed in claim 1 wherein said mobile assembly further comprises:
   a lower box section movable vertically;
   a lifting platform associated with and movable vertically relative to said lower box section; and wherein
   said thermoforming mold is removably mounted on said lifting platform.

8. Apparatus as claimed in claim 1 wherein:
   said feeding means comprises a first endless loop chain drive means;
   said first drive means comprises a first drive motor for driving said first endless loop chain drive means; and
   said second drive means comprises a second drive motor and coupling means for dynamically coupling said second drive motor to said first endless loop chain drive means for locking said mobile assembly to said first endless loop chain drive means for movement thereby at the same speed as the speed of the strip of material and for intermittently moving said mobile assembly in said opposite direction.

9. Apparatus as claimed in claim 8 wherein:
   said coupling means comprises a second endless loop chain drive means, a first gearwheel operatively engaging said second endless loop chain drive means and operatively connected to said first drive means to be driven thereby, a plurality of second gearwheels rotatably mounted on said mobile assembly and operatively engaging said second endless loop chain drive means, and means for kinematically coupling one of said plurality of second gearwheels to said second drive motor;
   said second drive motor being selectively operable so that when stopped said plurality of second gear wheels are non-rotatively connected to said second endless loop chain drive means for driving said mobile assembly by said first drive motor and when operated at a predetermined speed and direction one of said plurality of second gearwheels is driven in a direction and at a speed to move said mobile assembly in a reverse direction to said feed direction.

10. An apparatus for thermoforming strip material comprising:

longitudinally extending feeding means for receiving and engaging the longitudinal edges of thermoformable strip material;

first drive means engaging said feeding means for continuously driving said feeding means in a feed direction;

a mobile thermoforming assembly comprising, mold means movably mounted relative to the plane of movement of said strip material when fed in said feed direction for movement into thermoforming engagement with said strip material and for movement in said feed direction;

heating means upstream relative to said feed direction, of said mold means for heating said strip material to thermoforming temperature, and second drive means coupled with said feeding means for moving said mobile assembly at the same speed in said feed direction as said strip material and intermittently in a direction opposite to said feed direction; and mobile assembly support means for supporting said mobile assembly for movement in said feed direction and said opposite direction, so that during continuous movement of said feeding means and strip material said strip material is heated prior to thermoforming and thermoformed by said mold means while moving in thermoforming engagement with said strip material, said mold means being retracted out of engagement with said strip material after said thermoforming and returned in said opposite direction for a succeeding thermoforming operation.

11. Apparatus as claimed in claim 10 wherein:
said mobile thermoforming assembly further comprises a framework, said mold means, heating means and second drive means being supported on said framework; and
said mobile assembly support means comprises means for supporting said framework for said movement of said mobile assembly.

12. Apparatus as claimed in claim 11 wherein:
said feeding means comprises an endless chain means; and
said second drive means comprises gear means rotatably mounted on said framework and engaging said endless chain means, and second drive motor means mounted on said framework and coupled to said gear means for preventing rotation of said gear means to lock said gear means to said endless chain means and for rotating said gear means to move said mobile assembly relative to said endless chain means.

13. Apparatus as claimed in claim 11 wherein:
said heating means comprises a heater frame and a plurality of heating elements adjustably mounted on said heater frame for adjusting the heat received by the strip material from each heating element.

14. Apparatus as claimed in claim 11 wherein:
said heating means comprises a heater frame and a plurality of heating elements mounted on said heater frame, each heating element being adjustable independently to control the heating power thereof.

15. Apparatus as claimed in claim 11 wherein said mobile assembly further comprises:
a lower box section mounted on said framework for vertical movement;
a lifting platform associated with and movable vertically relative to said lower box section; and wherein
said thermoforming mold is removably mounted on said lifting platform.

16. Apparatus as claimed in claim 10 wherein:
said feeding means comprises a first endless loop chain drive means;
said first drive means comprises a first drive motor for driving said first endless loop chain drive means; and
said second drive means comprises a second drive motor and coupling means for dynamically coupling said second drive motor to said first endless loop chain drive means for locking said mobile assembly to said first endless loop chain drive means for movement thereby at the same speed as the speed of the strip material and for intermittently moving said mobile assembly in said opposite direction.

17. Apparatus as claimed in claim 16 wherein:
said coupling means comprises a second endless loop chain drive means, a first gearwheel operatively engaging said second endless loop chain drive means and operatively connected to said first drive means to be driven thereby, a plurality of second gearwheels rotatably mounted on said mobile assembly and operatively engaging said second endless loop chain drive means, and means for kinematically coupling one of said plurality of second gearwheels to said second drive motor;
said second drive motor being selectively operable so that when stopped said plurality of second gear wheels are non-rotatively connected to said second endless loop chain drive means for driving said mobile assembly by said first drive motor and when operated at a predetermined speed and direction one of said plurality of second gearwheels is driven in a direction and at a speed to move said mobile assembly in a reverse direction to said feed direction.

* * * * *